United States Patent [19]

Ito et al.

[11] Patent Number: 4,962,961
[45] Date of Patent: Oct. 16, 1990

[54] AUTOMOBILE FRONT BODY STRUCTURE

[75] Inventors: Keizo Ito, Hiroshima; Mitsuyuki Shoda, Aki, both of Japan

[73] Assignee: Mazda Motor Corporation, Hiroshima, Japan

[21] Appl. No.: 327,775

[22] Filed: Mar. 23, 1989

[30] Foreign Application Priority Data

Mar. 23, 1988 [JP] Japan .................................. 63-67280

[51] Int. Cl.⁵ ............................................. B62D 21/00
[52] U.S. Cl. ...................................... 296/192; 296/194
[58] Field of Search ................................. 296/192, 194

[56] References Cited

U.S. PATENT DOCUMENTS

| 4,285,540 | 8/1981 | Harada et al. | 296/192 |
| 4,466,654 | 8/1984 | Abe | 296/192 |
| 4,699,419 | 10/1987 | Kawase et al. | 296/192 |
| 4,718,712 | 1/1988 | Nakatani | 296/192 |
| 4,718,713 | 1/1988 | Sakamoto et al. | 296/192 |

FOREIGN PATENT DOCUMENTS 60-105272 7/1985 Japan .
61-185681 11/1986 Japan .

Primary Examiner—Robert R. Song
Attorney, Agent, or Firm—Wenderoth, Lind & Ponack

[57] ABSTRACT

An automobile front body structure comprising a dashboard lower panel positioned below a front windshield and extending laterally across an automobile body structure so as to define an engine room and a passenger's compartment on respective sides thereof, a cowl box of generally elongated box-like configuration mounted atop the dashboard lower panel while extending laterally across the automobile body structure, and a generally elongated windshield support beam structure of generally closed hollow cross-section extending laterally across the automobile body structure for supporting the windshield from below. The beam structure is formed in an upper region of the cowl box. An upper portion of the cowl box has a first opening defined therein for communicating the interior of the cowl box to the outside. A bottom portion of the cowl box has a second opening defined therein opening towards the passenger's compartment and communicating with a suction port of an air conditioner. The interior of the beam structure and the second opening are communicated with each other through a connecting passage and a portion of the interior of the cowl box and the interior of the beam structure are communicated with a vent opening defined frontwardly of the beam structure.

4 Claims, 5 Drawing Sheets

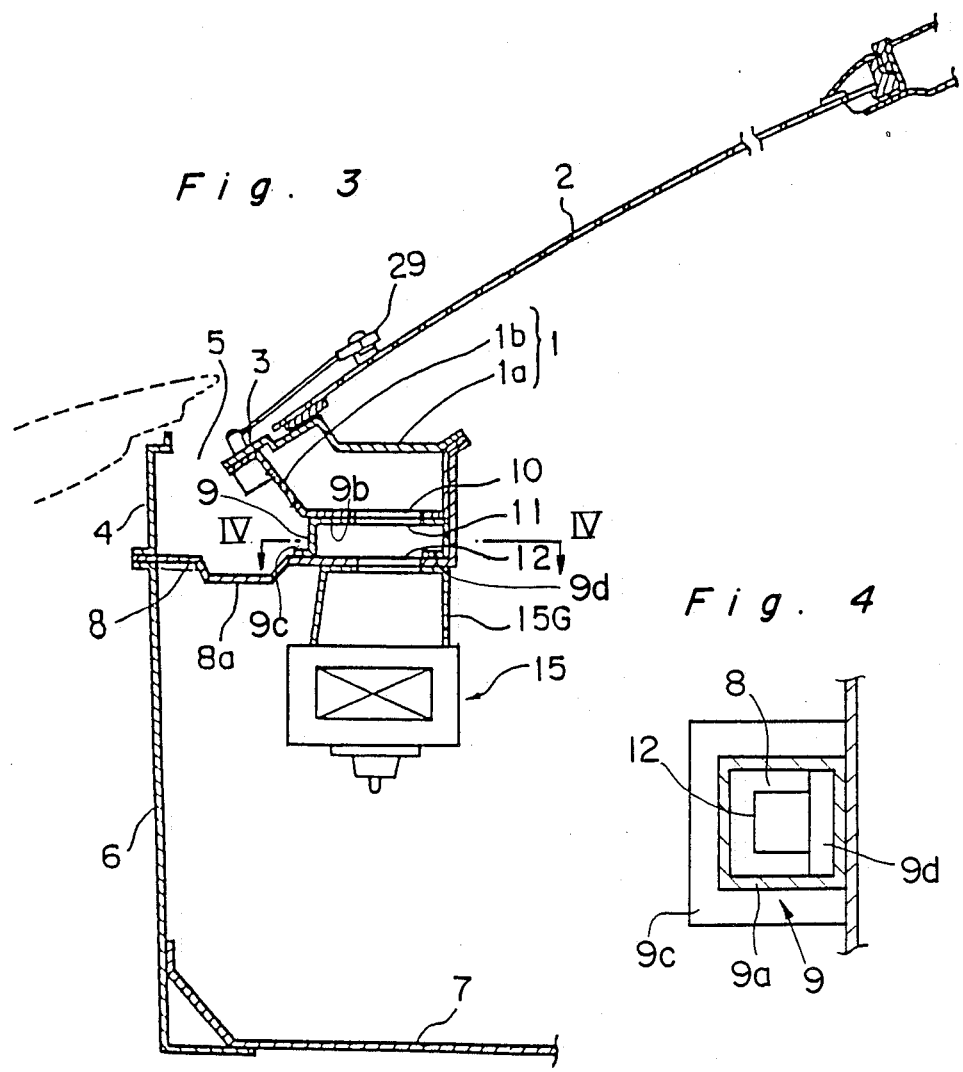

AUTOMOBILE FRONT BODY STRUCTURE

BACKGROUND OF THE INVENTION

1. Field of the Invention

The present invention generally relates to an automobile body structure and, more particularly, to an automobile front body structure beneath the front windshield.

2. Description of the Prior Art

It is well known that an automobile body structure has a dashboard positioned below the front windshield so as to divide the interior of the body structure into an engine room and a passenger's compartment. For example, the Japanese Laid-open Utility Model Publication No. 61-185681, published Nov. 19, 1986, discloses, as reproduced in FIG. 11 of the accompanying drawings, the use of a dashboard lower panel positioned immediately below the front windshield and extending widthwise of the automobile body structure. A cowl box 101 of generally elongated box-like configuration is rigidly mounted atop the dashboard lower panel with its opposite ends welded to adjacent side walls on respective sides of the engine room. The cowl box 101 has a cowl upper panel 102 perforated at generally intermediate regions to provide vent openings 103 which are communicated to the outside. The cowl box 101 also has drain openings 106 defined at respective lower regions of the opposite side panels 105.

The dashboard upper panel 111 at the bottom of the cowl box 101 has a vent opening defined therein in communication with the passenger's compartment and also has a blower 112 rigidly secured thereto. The interior of the cowl box 101 is utilized as a conditioned air flow passage. In order to avoid any possible ingress of water, which has entered the vent opening, to the passenger's compartment, a baffle plate 4 is rigidly mounted on the bottom of the cowl box so as to surround the vent opening.

Apart from the disclosure made in the Japanese Laid-open Utility Model Publication NO. 61-185681 referred to above, it is generally recognized as a recent trend to design the automobile body structure wherein the bonnet as well as the cowl are positioned relatively low so as to meet an increasing demand for a sophisticated and appealing feature and/or an aerodynamic feature to be found in the automobile body structure. However, it is difficult to lower the position of the dashboard lower panel while maintaining a sufficient sitting space for an automobile driver and it appears that the only remedy available is to reduce the vertical dimension of the cowl.

It is also well known that, in order to provide a sufficient rigidity in supporting the front windshield against any possible automobile collision, a support portion of the cowl box for the support of the front windshield from below is fabricated so as to represent a generally closed hollow cross-section such as disclosed in, for example, the Japanese Laid-open Utility Model Publication No. 60-105272 published July 18, 1985. If in such structure an attempt is made to lower the position of the bonnet as well as that of the cowl, the space of the cowl box in the vertical direction is required to be further reduced.

Moreover, if an attempt is made to install a baffle plate within the interior of the cowl box, the baffle plate has to be reduced in height, or it cannot be installed within the cowl box. Where a sufficient height cannot be secured in the baffle plate, water entering into the cowl box through the vent opening during, for example, car washing or raining cannot be effectively prevented from entering the passenger's compartment.

SUMMARY OF THE INVENTION

The present invention has been devised with a view to substantially eliminating the above discussed problems inherent in the prior art automobile front body structure and has for its essential object to provide an improved automobile front body structure effective to assuredly avoid any possible ingress of water from the outside into the passenger's compartment by way of the cowl box while both of the bonnet and the cowl are lowered in position with a simplified means.

To this end, the present invention provides an automobile front body structure comprising a dashboard lower panel positioned below a front windshield and extending widthwise of an automobile body structure so as to define an engine room and a passenger's compartment on respective sides thereof, a cowl box of generally elongated box-like configuration rigidly mounted atop the dashboard lower panel while extending widthwise of the automobile body structure and having its opposite ends rigidly secured to corresponding side walls defining the engine room in cooperation with the dashboard lower panel, and a generally elongated windshield support beam structure of generally closed hollow cross-section extending widthwise of the automobile body structure for supporting the windshield from below, said beam structure being formed in an upper region of the cowl box. An upper portion of the cowl box frontwardly of the beam structure with respect to the direction as viewed from the passenger's compartment towards the engine room has a first opening defined therein for communicating the interior of the cowl box to the outside. A bottom portion of the cowl box has a second opening defined therein so as to open towards the passenger's compartment and communicate with a suction port of an air conditioner.

The interior of the beam structure and the second opening are communicated with each other through a connecting passage and a portion of the interior of the cowl box and the interior of the beam structure are communicated with a vent opening defined frontwardly of the beam structure.

According to the present invention, the path of flow of air entering the interior of the cowl box from the outside and the path of flow of water are completely isolated from each other and, therefore, no water will flow into the path of flow of the air. Also, the cowl box is essentially divided into two sections by a partition wall which advantageously serves to increase the rigidity of the cowl box.

BRIEF DESCRIPTION OF THE DRAWINGS

These and other objects and features of the present invention will become clear from the following description taken in conjunction with the preferred embodiments thereof with reference to the accompanying drawings, in which:

FIG. 3 is a schematic cross-sectional view, on an enlarged scale, taken along the line III—III in FIG. 1;

FIG. 4 is a cross-sectional view taken along the line IV—IV in FIG. 3;

FIG. 5 is a fragmentary view similar to FIG. 3, showing a modification thereof;

FIG. 6 is a cross-sectional view taken along the line VI—VI in FIG. 5;

DETAILED DESCRIPTION OF THE INVENTION

Figure 1:
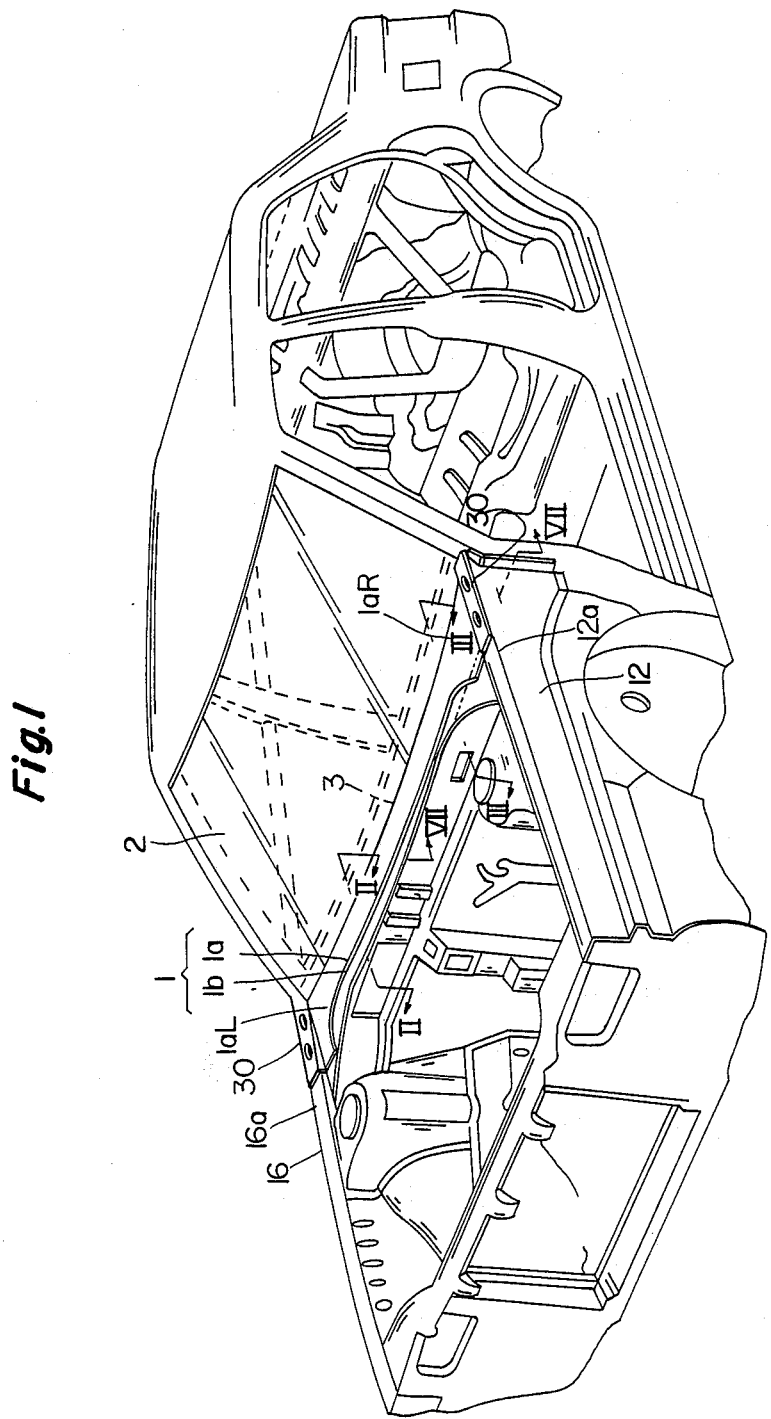
FIG. 1 is a three-quarter front perspective view of an automobile body structure embodying the present invention.

Before the description of the present invention proceeds, it is to be noted that like parts are designated by like reference numerals throughout the accompanying drawings.

Figure 2:
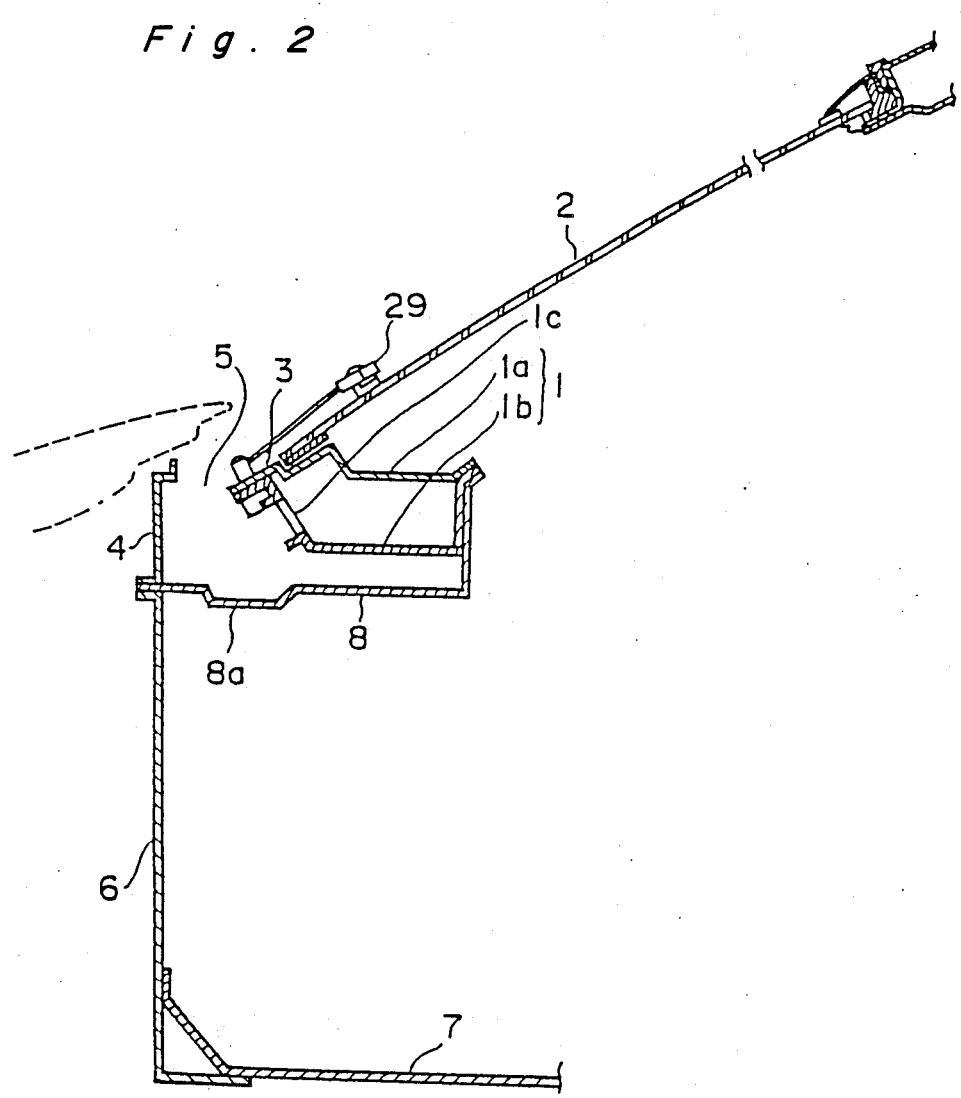
FIG. 2 is a schematic cross-sectional view, on an enlarged scale, taken along the line II—II in FIG. 1.

Referring first to FIG. 1 showing a three-quarter perspective view of an automobile body structure embodying the present invention, reference numeral 1 represents a generally elongated windshield support beam structure of generally closed hollow cross-section for the support of a front windshield 2 from below. As best shown in FIGS. 2 and 3, the automobile body structure has a dashboard lower panel 6 extending widthwise thereof so as to define an engine room and a passenger's compartment on respective sides thereof. The dashboard lower panel 6 has an upper portion on which a cowl box of generally elongated box-like configuration is mounted so as to extend widthwise of the automobile body structure. The cowl box is comprised of a generally elongated cowl upper panel 1a, a generally elongated cowl front panel 4 and a dashboard upper panel 8 and has its opposite ends 30 welded to respective upper portions 16a of cowl upper side panels 16. The cowl box has an interior defined therein and has a cowl reinforcement member 1b installed within the interior thereof so as to extend generally horizontally thereby to divide the interior of the cowl box into upper and lower chambers. The windshield support beam structure 1 referred to is defined partially by the cowl upper panel 1a which forms a part of the cowl box.

The assembly described above is effective to increase the rigidity of the windshield support beam structure 1 and assuredly supports from below the front windshield 2 even though the front windshield 2 is installed in steeply inclined fashion such that both the bonnet and the cowl box are positioned relatively low.

A first opening 5 for communicating the interior of the cowl box and the outside is defined at a portion of the windshield support beam structure 1 between a front edge 3 of said windshield support beam structure 1 and the cowl front panel 4. Also a second opening 12 adapted to be fluid connected with a suction port assembly 15G of an air conditioner 15 is defined in one end portion of the dashboard upper panel 8 at the bottom of the cowl box so as to open towards the passenger's compartment.

The cowl reinforcement member 1b has a front portion raised so as to protrude generally diagonally frontwardly and upwardly from the remainder thereof, which front portion has a vent opening 1c defined at a generally intermediate portion thereof. The vent opening 1c defined in the front portion of the cowl reinforcement member 1b communicates the interior of the windshield support beam structure therethrough with the first opening 5. The cowl reinforcement member 1b is also formed with an opening 10 defined therein at one end portion thereof so as to open downwardly.

In the illustrated embodiment of FIG. 3 and 4, a baffle generally identified by 9 is of a generally box-like configuration including four side walls generally identified by 9a and assembled so as to represent a generally rectangular cross-section, a top wall 9b having an opening 11 defined therein. Respective lower end portions of three of the side walls 9a which are not held in contact with an upright wall portion of the dashboard upper panel 8 are bent so as to protrude generally radially outwardly of the baffle 9 to provide connecting flanges generally identified by 9c while a corresponding lower end portion of the remaining side wall 9a is bent inwardly of the baffle 9 so as to provide a connecting flange 9d as best shown in FIGS. 3 and 4. This baffle 9 is interposed between a horizontal portion of the dashboard upper panel 8 and the cowl reinforcement member 1b with the top wall 9b rigidly connected to the undersurface of the cowl reinforcement member 1b and also with the flanges 9c and 9d rigidly connected to the horizontal portion of the dashboard upper panel 8. One of the four side walls 9a which confronts the upright wall portion of the dashboard upper panel 8 may or may not be spot-welded to such upright wall portion of the dashboard upper panel 8.

The baffle 9 so interposed between the horizontal portion of the dashboard upper panel 8 and the cowl reinforcement member 1b has the opening 11 in the top wall 9b aligned with the opening 10 in the cowl reinforcement member 1b and also has the opening adjacent the flanges 9c and 9d aligned with the second opening 12 defined in the end portion of the horizontal portion of the dashboard upper panel 8.

The baffle 9 defines therethrough a passage communicating between the interior of the windshield beam structure 1 and the passenger's compartment while isolating the remainder of the interior of the cowl box from the passenger's compartment with respect to passage of water.

Figure 7:
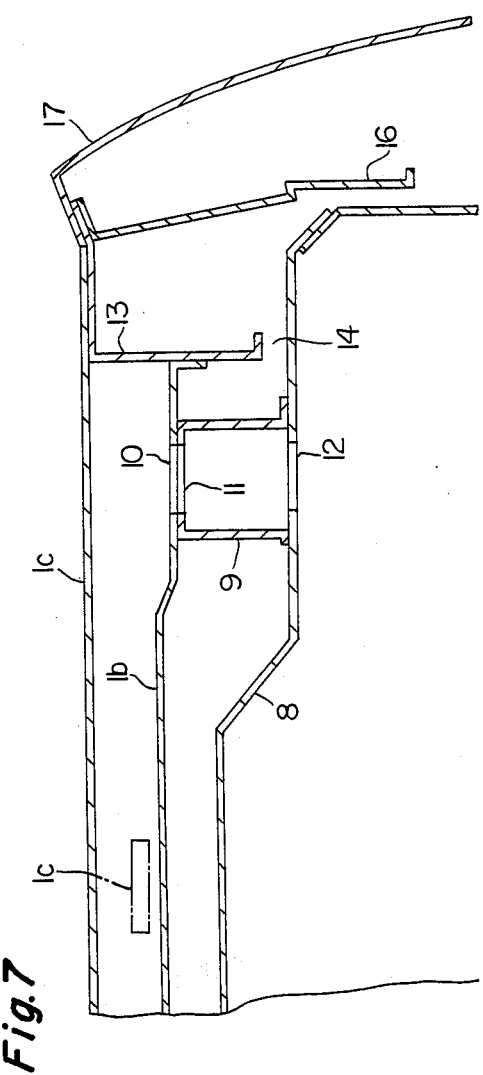
FIG. 7 is a fragmentary cross-sectional view, on an enlarged scale, taken along the line VII—VII in FIG. 1.
Figure 8:
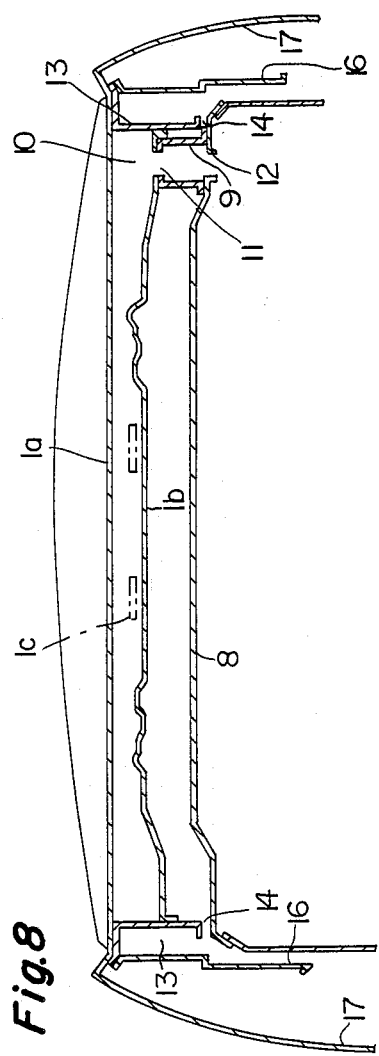
FIG. 8 is view similar to FIG. 7, showing a cowl box extending full width of the automobile body structure.
Figure 9:
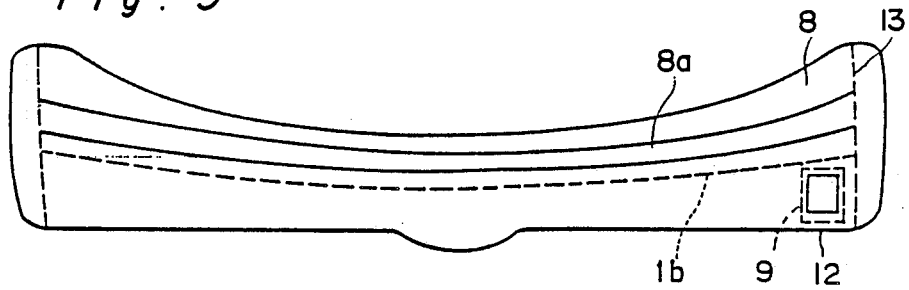
FIG. 9 is a bottom plan view of the cowl box.

The horizontal portion of the dashboard upper panel 8 has a depressed duct defined at 8a and extending widthwise of the automobile body structure for the drainage of water. As best shown in FIGS. 7 and 8, a drain passage is defined at 14 between the horizontal lying portion of the dashboard upper panel 8 and each of inner vertical panels 13 to which the opposite ends of the cowl reinforcement member 1b are welded. The drain passages 14 on respective sides of the automobile body structure are communicated with the depressed duct 8a in the horizontal portion of the dashboard upper panel 8 so that water entering the interior of the cowl box can be drained to the outside through the passages 14 without entering the interior of the windshield support beam structure 1 through which air flows.

It is to be noted that reference numeral 7 used in FIGS. 2 and 3 represents a boot floor panel within the passenger's compartment, reference numeral 17 used in FIG. 7 and 8 represents fender panels on respective sides of the automobile front body structure covering front wheels, and reference numeral 29 used in FIGS. 2 and 3 represents a windshield wiper of any known construction.

Figure 10:
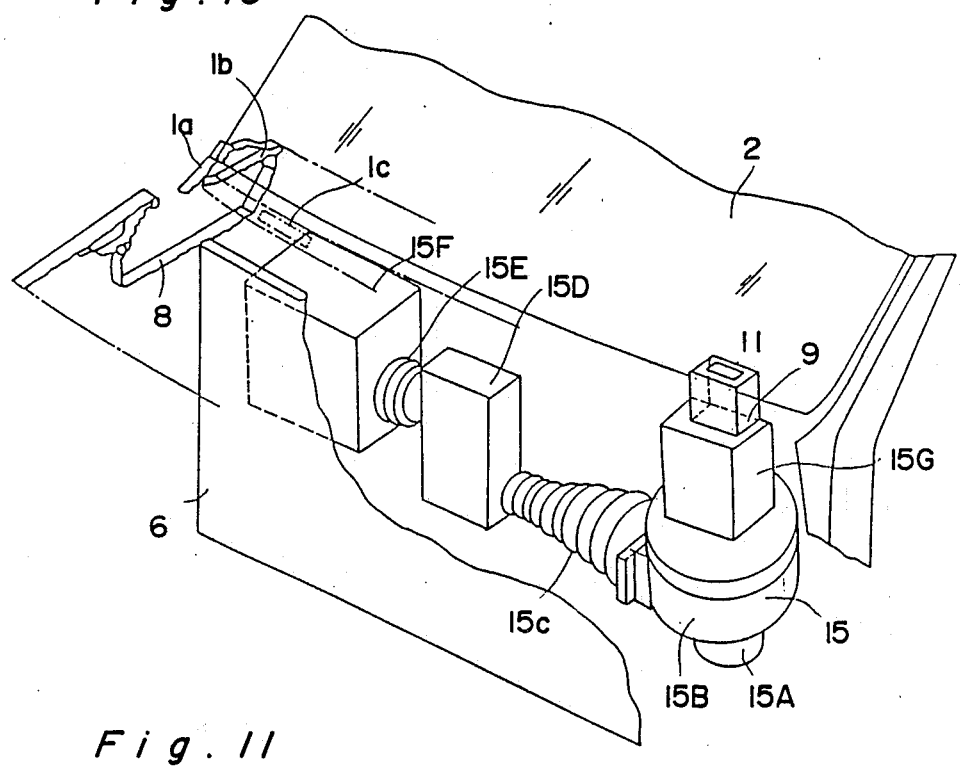
FIG. 10 is a schematic diagram showing the general layout of an air-conditioner and its associated parts in the engine room.
Figure 11:
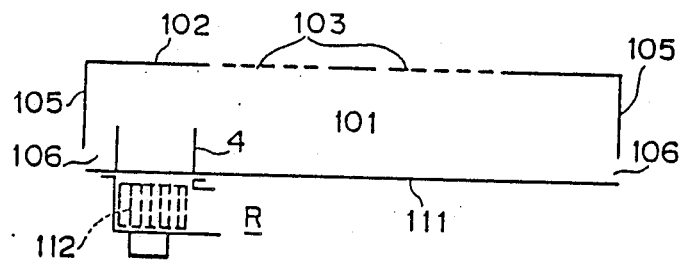
FIG. 11 is a schematic diagram showing the prior art cowl box.

The manner in which the air conditioner 15, having its suction port assembly 15G communicated with the interior of the cowl box through the second opening 12 as hereinbefore described is supported is best shown in FIG. 10. As shown therein, the air conditioner 15 includes a blower 15B adapted to be driven by a drive motor 15A and communicated with a cooling unit 15D through a connecting tube 15c and then with a heating unit 15F through a connecting tube 15E.

Referring now to FIGS. 5 and 6, a modified form of the baffle 9 is shown. The baffle 9 according to the modification of FIGS. 5 and 6 is of a generally box-like configuration defined by three side walls 9a and a top wall 9b having an opening 11 defined therein and in cooperation with a portion of the upright wall portion of the dashboard upper panel 8. Respective lower end portions of the three side walls 9a are bent so as to protrude generally radially outwardly of the baffle 9 to provide connecting flanges generally identified by 9c. Two of the side walls which confront and are parallel to each other have their free edge portions formed integrally with respective vertical flanges 9e protruding outwardly and in opposite directions with respect to each other. These vertical flanges 9e are used to connect the baffle 9 rigidly to the upright portion of the dashboard upper panel 8.

This baffle 9 is interposed between the horizontal portion of the dashboard upper panel 8 and the cowl reinforcement member 1b with the top wall 9b rigidly connected to the undersurface of the cowl reinforcement member 1b, with the flanges 9c rigidly connected to the horizontal portion of the dashboard upper panel 8 and with the vertical flanges 9e rigidly connected to the upright portion of the dashboard upper panel 8.

While the baffle 9 according to the modification shown in FIGS. 5 and 6 functions in a manner identical with the baffle 9 shown in FIGS. 3 and 4, the baffle 9 of FIGS. 5 and 6 can be assembled with a minimized number of component parts as compared with that of FIGS. 3 and 4.

From the foregoing description of the preferred embodiment of the present invention, it has now become clear that, since the interior of the windshield support beam structure is completely isolated from the interior of the cowl box (with the exception of opening 1c), water flowing through the first opening into the interior of the cowl box will not enter the interior of the windshield support beam structure. Also, the employment of the cowl reinforcement member disposed inside the cowl box serves to provide an increased rigidity to the cowl box as well as the windshield support beam structure and, therefore, even when the front windshield is supported in steeply inclined fashion such that both the bonnet and the cowl are positioned relatively low, the front windshield can be assuredly supported while providing a sophisticated and streamlined design feature of the automobile body structure.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An automobile front body structure comprising:
   a dashboard lower panel adapted to be positioned below a front windshield and to extend laterally across an automobile body so as separate an engine room and a passenger compartment;
   an elongated box-shaped cowl box rigidly mounted to an upper portion of said dashboard lower panel and adapted to extend laterally across the automobile body between sidewalls thereof, said cowl box including a horizontal elongated bottom panel extending along its length and having an opening formed therein between the interior of said cowl box and the passenger compartment;
   means for rigidly securing each end of said cowl box to a respective one of the sidewalls of the automobile body;
   an elongated substantially closed hollow windshield support beam defined in an upper portion of said cowl box along the length thereof and adapted to support a bottom edge of the windshield, said windshield support beam including an elongated bottom wall along the length thereof substantially separating the interior of said windshield support beam from the portion of the interior of said cowl box outside said windshield support beam, said bottom wall of said windshield support beam having an opening formed therein at a location adjacent one end thereof and a vent opening formed therein communicating between said interior of said windshield support beam and said portion of said interior of said cowl box outside said windshield support beam; and
   means, mounted between said bottom wall of said windshield support beam and said bottom panel of said cowl box, for defining a communication passage between said opening formed in said bottom wall of said windshield support beam and said opening formed in said bottom panel of said cowl box.

2. An automobile front body structure as recited in claim 1, wherein
   said communication passage defining means comprises a baffle.

3. An automobile front body structure as recited in claim 2, wherein
   said bottom panel of said cowl box comprises a horizontal portion and a portion bent upwardly from said horizontal portion;
   said baffle is mounted between said bottom wall of said windshield support beam and said horizontal portion of said bottom panel of said cowl box and comprises first, second, third and fourth side walls, a top wall, flanges extending outwardly from said first, second and third side walls, respectively, and a flange extending inwardly from said fourth side wall; and
   each of said flanges is rigidly connected to said horizontal portion of said bottom panel of said cowl box, said top wall is rigidly connected to said bottom wall of said windshield support beam and said fourth side wall is rigidly connected to said upwardly bent portion of said bottom panel of said cowl box.

4. An automobile front body structure as recited in claim 2, wherein
   said bottom panel of said cowl box comprises a horizontal portion and a portion bent upwardly from said horizontal portion;

said baffle is mounted between said bottom wall of said windshield support beam and said horizontal portion of said bottom panel of said cowl box and comprises three side walls assembled together in a U-shape which opens toward and abuts said upwardly bent portion of said bottom panel of said cowl box, a top wall mounted on top of said three sidewalls, horizontal flanges extending outwardly from lower ends of each of said three side walls, respectively, and vertical flanges extending outwardly from two of said three side walls which abut said upwardly bent portion of said bottom panel of said cowl box, respectively, at ends of said twosidwalls adjacent said upwardly bent portion of said bottom panel of said cowl box; and said horizontal flanges are rigidly connected to said horizontal portion of said bottom panel of said cowl box, said vertical flanges are rigidly connected to said upwardly bent portion of said bottom panel of said cowl box and said top wall is rigidly connected to said bottom wall of said windshield support beam.

* * * * *